(12) United States Patent
Woo et al.

(10) Patent No.: US 8,687,855 B2
(45) Date of Patent: Apr. 1, 2014

(54) METHOD FOR DETECTING FACIAL FEATURES

(75) Inventors: Jeong Woo Woo, Seoul (KR); Mallikarjuna Rao Talluri, Karnataka (IN)

(73) Assignee: LG Innotek Co., Ltd., Seoul (KR)

( * ) Notice: Subject to any disclaimer, the term of this patent is extended or adjusted under 35 U.S.C. 154(b) by 388 days.

(21) Appl. No.: 13/214,497

(22) Filed: Aug. 22, 2011

(65) Prior Publication Data
US 2012/0328199 A1   Dec. 27, 2012

(30) Foreign Application Priority Data

Jun. 24, 2011   (KR) .................. 10-2011-0061590

(51) Int. Cl.
*G06K 9/00*   (2006.01)

(52) U.S. Cl.
USPC ........................................... 382/118

(58) Field of Classification Search
USPC .......................................... 382/118
See application file for complete search history.

(56) References Cited

U.S. PATENT DOCUMENTS

| | | | |
|---|---|---|---|
| 6,181,805 B1* | 1/2001 | Koike et al. | 382/118 |
| 7,912,246 B1* | 3/2011 | Moon et al. | 382/103 |
| 2007/0120948 A1* | 5/2007 | Fujioka et al. | 348/14.01 |
| 2010/0316265 A1* | 12/2010 | Nakanowatari et al. | 382/118 |
| 2011/0081089 A1* | 4/2011 | Mori et al. | 382/218 |
| 2012/0051638 A1* | 3/2012 | Kawai et al. | 382/170 |
| 2013/0050502 A1* | 2/2013 | Saito et al. | 348/169 |

* cited by examiner

*Primary Examiner* — Samir Ahmed
(74) *Attorney, Agent, or Firm* — Saliwanchik, Lloyd & Eisenschenk

(57) ABSTRACT

A method for detecting facial feature is provided. Concerned points and concerned areas are extracted from a captured image, and an area which is considered to highly possibly include a facial area is selected. It is determined whether the selected area corresponds to a facial feature by using a support vector machine.

4 Claims, 5 Drawing Sheets

(d) DIVISION TO SUB AREAS (e) EXTRACTING LOCAL MAXIMA POINTS (f) SELECTING OPTIMUM AREAS FOR LOCAL MAXIMA POINTS (g) DETECTING FACIAL FEATURE

METHOD FOR DETECTING FACIAL FEATURES

CROSS-REFERENCE TO RELATED APPLICATIONS

This application claims the benefit under 35 U.S.C. §119 to Korean Patent Application No. 10-2011-0061590, filed 24 Jun. 2011, which is hereby incorporated by reference in its entirety.

BACKGROUND

Techniques for detecting a face in a captured image are widely used in various fields. For instance, the techniques are used for a digital camera to mark a face part in an image displayed on a preview screen. Or, by using the techniques, a face of a driver is monitored to automatically sound an alarm when the driver dozes off while driving.

According to a related art, for detecting facial features, e.g., eyes, nose, mouth, and ears, in a captured image, concerned areas which are considered to include facial features are conjectured, and characteristics of facial features, e.g., the fact that eyes are two and located on an upper part of a face, are used.

However, according to the above-described related art, facial features may not be effectively detected when a condition of taking an image is changed, or a direction of an image is changed.

BRIEF SUMMARY

Embodiments provide methods for efficiently detect facial features in a captured image regardless of an image taking condition or an image direction.

In one embodiment, a method for detecting a facial feature includes extracting a face area from a captured image; extracting concerned points from the extracted face area; dividing the extracted face area to a plurality of sub areas; extracting local maxima points from the plurality of sub areas; selecting optimum areas, which have highest similarities with a feature image, around the extracted local maxima points; and determining which one of the selected optimum areas has a largest value of similarity among the highest similarities.

The details of one or more embodiments are set forth in the accompanying drawings and the description below. Other features will be apparent from the description and drawings, and from the claims.

DETAILED DESCRIPTION

Figure 1:
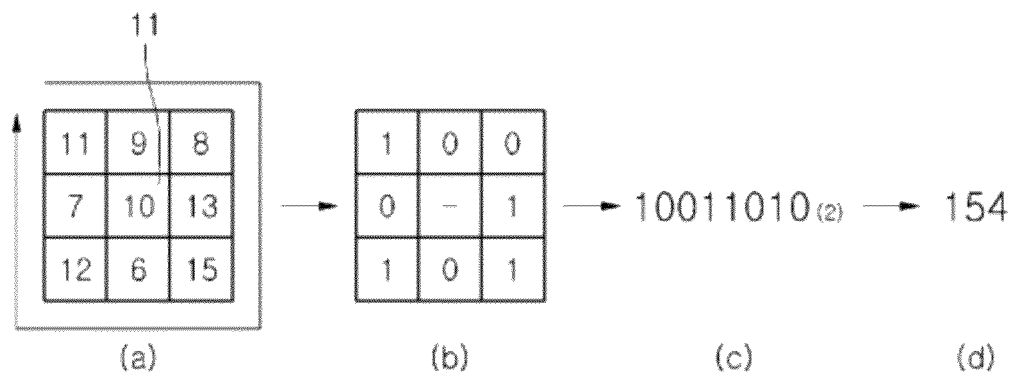
FIG. 1 illustrates a method of extracting local binary patterns for images to determine similarity between the images, according to an embodiment.

The present disclosure may be variously modified and may include various embodiments. However, particular embodiments are exemplarily illustrated in the drawings and will be described in detail.

However, it should be understood that the particular embodiments are not intended to limit the present disclosure to specific forms, but rather the present disclosure is meant to cover all modification, similarities, and alternatives which are included in the spirit and scope of the present disclosure.

Relational terms such as first, second, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

The present disclosure relates to a method for detecting facial features, e.g., eyes, nose, and mouth, in an image. In detail, according to the present disclosure, a concerned point and a concerned area are extracted from an image which includes a face to select an area which is considered to highly possibly include a facial feature, and it is determined whether the selected area is a facial feature by using a support vector machine. According to the present disclosure, facial features may be more efficiently detected in an image that includes a face regardless of an image taking condition or an image direction.

Hereinafter, embodiments will be described in detail with reference to the accompanying drawings.

FIG. 1 illustrates a method of extracting local binary patterns for images to determine similarity between the images, according to an embodiment.

For determining similarity between images each of which has a size of, e.g., 16×16 pixels, the local binary patterns may be extracted for all or partial pixels composing the images.

Firstly, as illustrated in (a) of FIG. 1, brightness values of a pixel 11 and eight pixels adjacent to the pixel 11 are extracted by applying a mask having a certain size, e.g., 3×3, to each pixel, e.g., pixel 11, composing an image.

As illustrated in (b) of FIG. 1, for the adjacent pixels, 1 is assigned to a pixel having a larger brightness value than that of the pixel 11 and 0 is assigned to a pixel having a smaller brightness value than that of the pixel 11.

As illustrated in (c) of FIG. 1, by arranging the values of 1 or 0 for the adjacent pixels, a binary number is generated. The generated binary number is converted to a decimal number as illustrated in (d) of FIG. 1.

By performing a process on the pixels composing a single image as illustrated in FIG. 1, local pattern values for each pixels, e.g., the value '154' in (d) of FIG. 1, may be extracted. By representing the local pattern values for each pixels in a graph, a feature vector graph may be obtained as illustrated in FIG. 2.

Figure 2:
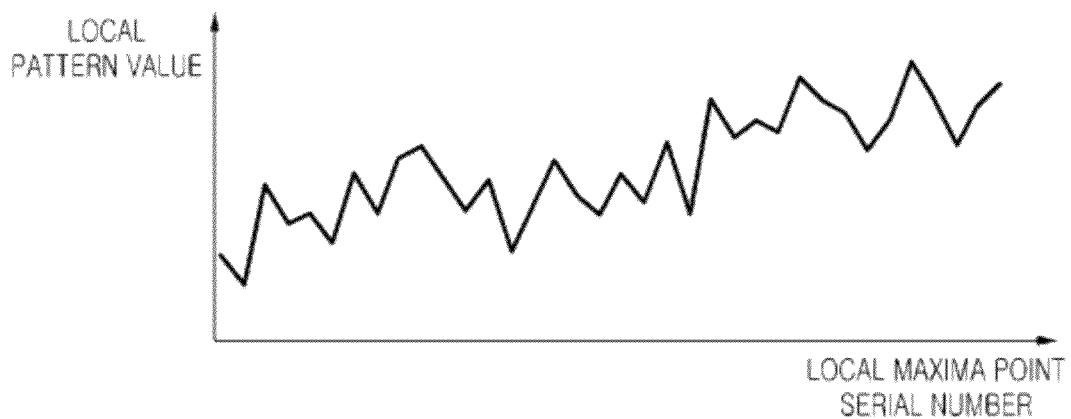
FIG. 2 is a graph illustrating a feature vector for one image, which is generated by a local binary pattern.

As described below, by extracting the feature vector graph as illustrated in FIG. 2 for a certain image, similarity between the certain image and a reference image may be measured.

Figure 3:
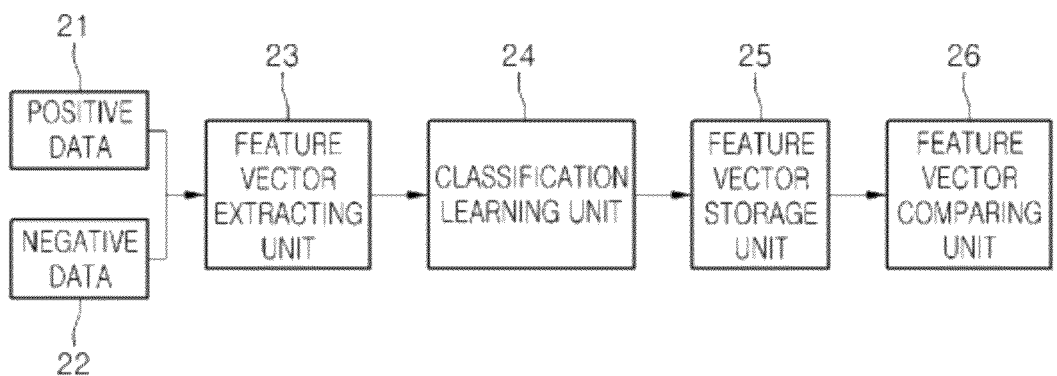
FIG. 3 is a block diagram illustrating a support vector machine which determines similarity between images by using a feature vector, according to an embodiment.

FIG. 3 is a block diagram illustrating a support vector machine which determines similarity between images by using a feature vector, according to an embodiment.

The support vector machine is an algorithm or device for determining what image corresponds to a particular feature by repeatedly learning the feature vector graph for a particular image. A positive data input unit 21 repeatedly provides positive image data including a facial feature, e.g., the eyes, and a negative data input unit 22 provides negative image data which do not include the eyes. A feature vector extracting unit 23 extracts the feature vector as illustrated in FIG. 2 from the inputted image data, and a classification learning unit 24 determines whether there is a feature of the eyes from patterns of the feature vector. A feature vector storage unit 25 stores features vectors for the positive and negative image data. A feature vector comparing unit 26 compares a feature vector of a newly inputted image with a learned feature vector to determine whether the inputted image includes a particular feature, e.g., the eyes.

By using the above-described support vector machine, it may be detected whether a particular image includes a facial feature, e.g., the eyes, nose, mouth, and ears, or where a facial feature is located in the particular image.

Figure 4:
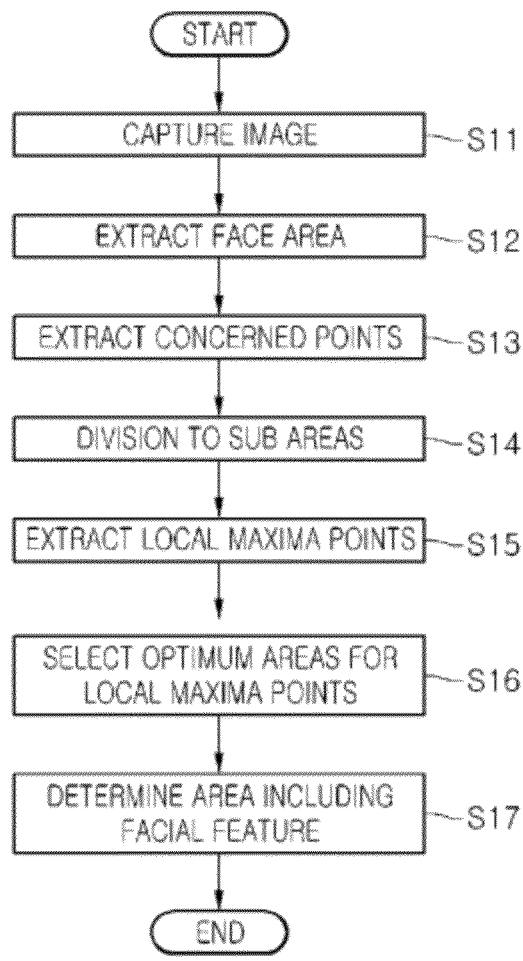
FIG. 4 is a flowchart illustrating a method of extracting a facial feature, according to an embodiment.
Figure 5A:
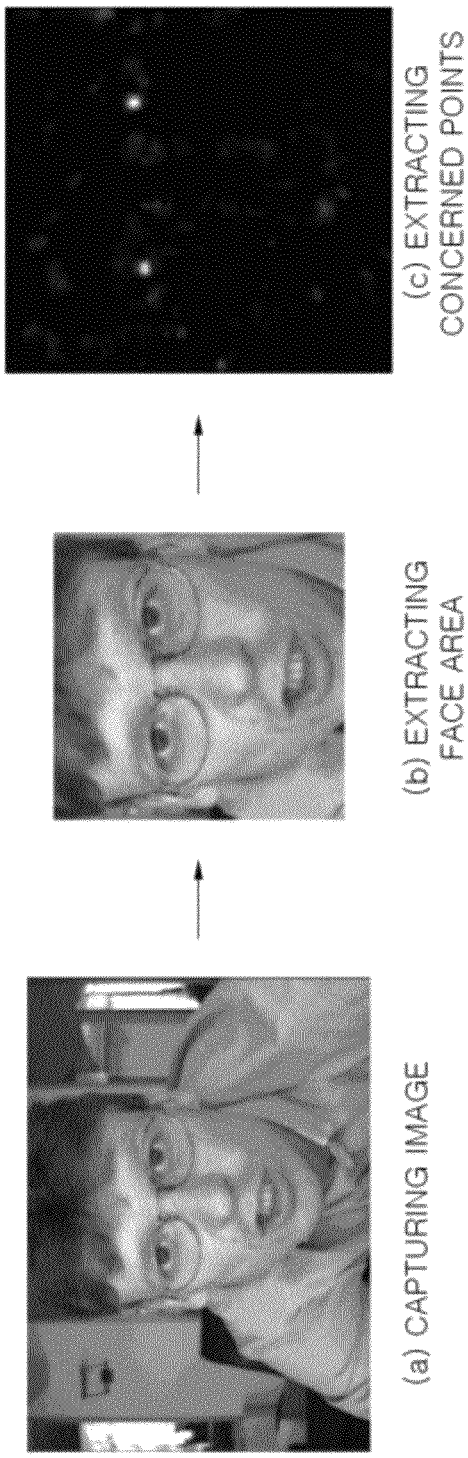
FIGS. 5A to 5B illustrate a method of extracting a facial feature from one image, according to an embodiment.
Figure 5B:
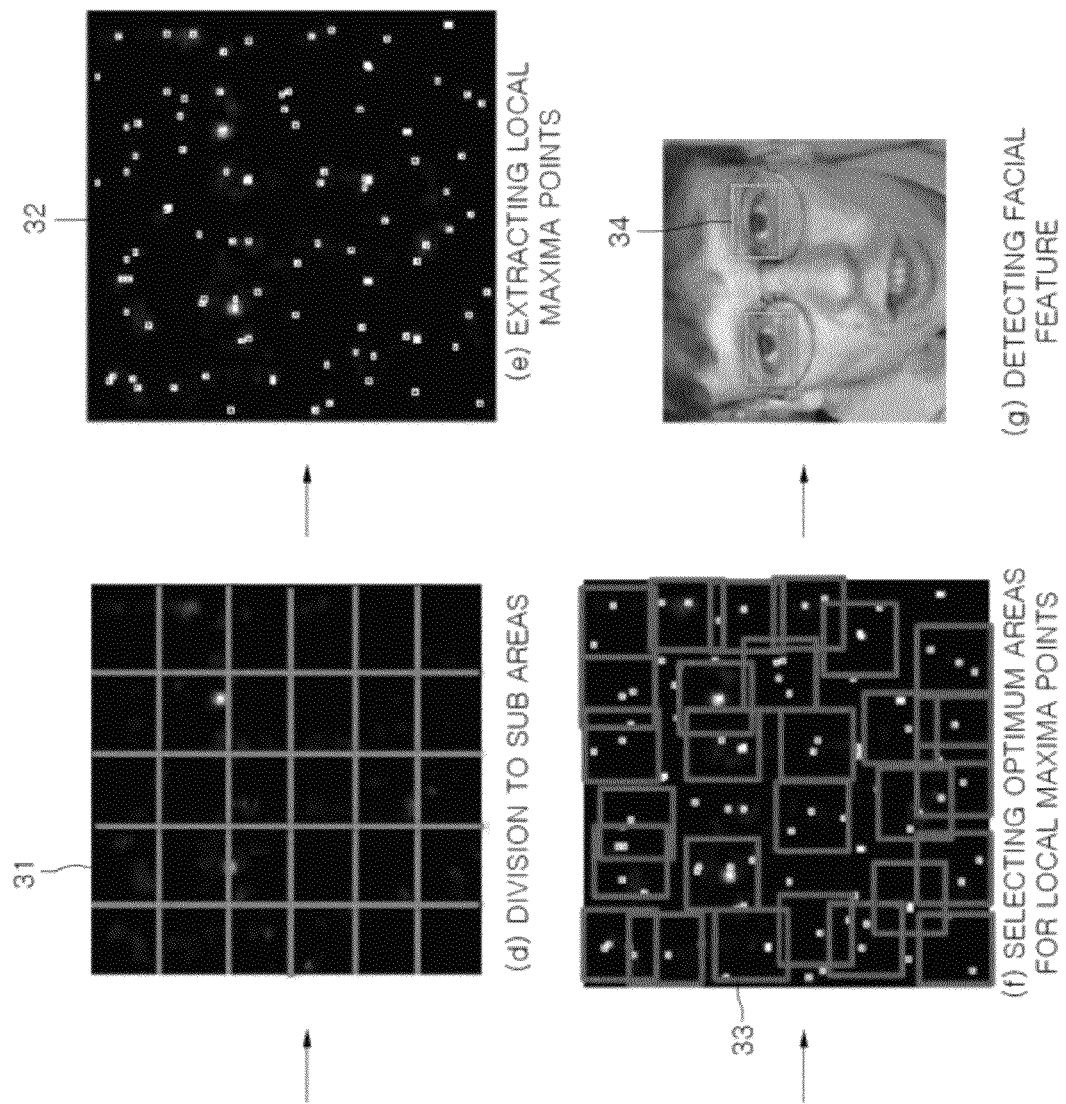

FIG. 4 is a flowchart illustrating a method of extracting a facial feature, according to an embodiment. This flowchart exemplarily describes a method of finding a position of a facial feature, e.g., the eyes, in an image including a face. FIG. 5A and FIG. 5B illustrate a method of extracting a facial feature from one image according to an embodiment. The method of extracting a facial feature will be described below with respect to FIGS. 4, 5A, and 5B.

In operation S11, an image is captured by an image sensor. The captured image may be (a) of FIG. 5A.

In operation S12, a face area is extracted from the captured image. Herein, the face area may be extracted by using well-known various algorithms, e.g., the Adaboost algorithm. The extracted face area may be (b) of FIG. 5A.

In operation S13, concerned points are extracted from the extracted face area. The concerned points correspond to positions of facial features, i.e., the eyes, nose, mouth, and ears, and may be extracted by using well-known various algorithms, e.g., the radial symmetry transform. The extracted concerned points may be expressed as (c) of FIG. 5A.

In operation S14, the image is divided to sub areas having same sizes. The divided sub area 21 may be expressed as (d) of FIG. 5B.

In operation S15, from the sub areas, pixels which have brightness values larger than a predetermined value among the concerned points are extracted. These pixels are local maxima points. The local maxima points may be expressed as (e) of FIG. 5B.

In operation S16, a desired facial feature, e.g., an area having the highest similarity with the eyes, i.e., an optimum area, is found near the local maxima points. A method of finding the optimum area will be described below.

Figure 6:
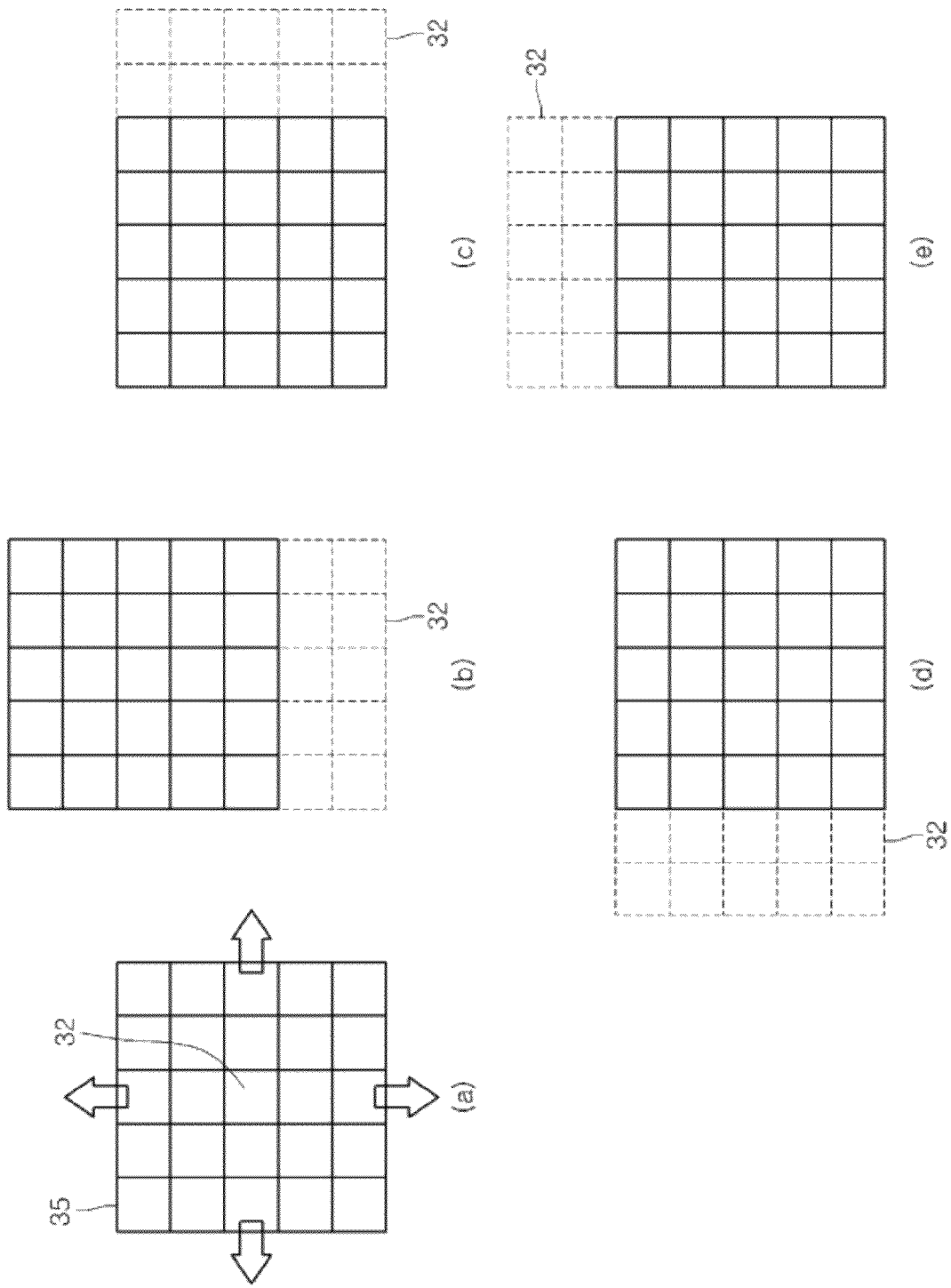
FIG. 6 illustrates a method of finding an optimum area for each local maxima point, according to an embodiment.

FIG. 6 illustrates a method of finding the optimum area for the local maxima points, according to an embodiment.

As illustrated in (a) of FIG. 6, a mask 35 having a predetermined size, e.g., 5×5, is configured around the local maxima point. A size the mask 35 may be changed according to an embodiment. The feature vector as illustrated in FIG. 2 is generated for the mask 35, and similarity with a facial feature, e.g., the eyes, is measured by the support vector machine.

Thereafter, as illustrated in (b) to (e) of FIG. 6, the mask 35 is shifted vertically and horizontally as much as, e.g., 3 pixels, to measure the similarity with a facial feature. (b) to (e) of FIG. 6 respectively illustrate upward-shifted state, left-shifted state, right-shifted state, and downward-shifted state. According to embodiments, the mask 35 may be shifted in four directions, i.e., upward, downward, leftward, and rightward, or in eight or more directions.

The feature vector is generated for each shifted mask, and the similarity with a facial feature, e.g., the eyes, is measured by the support vector machine. It is determined which one of the shifted masks has the highest similarity, and the mask is shifted again in the shifting direction of the selected mask. Then, the similarity is measured again.

In this manner, the optimum area having the highest similarity with an eye image may be selected around the local maxima point.

As described above, during the process of finding the optimum areas for the local maxima points, the similarity is measured. Herein, during the process of finding the optimum area of the plurality of local maxima points, measured similarity values are stored, and the optimum area having the highest similarity among the stored similarity values is determined. Then, this optimum area includes the facial feature.

Referring to FIGS. 4, 5A, and 5B again, (f) of FIG. 5B illustrates that optimum areas 33 have been selected for the local maxima points, and (g) of FIG. 5B illustrates that an area which has the highest similarity with the facial feature among the optimum areas 33, i.e., an area 34 including the facial feature, has been detected.

When it is detected where a facial feature, e.g., the eyes, is located in a captured image, an additional process may be performed. For instance, it may be further detected whether the eyes of a driver are closed to output an alert message to the driver.

By using the above-described method, facial features may be detected in an image that includes a face with reduced computational complexity regardless of an image taking condition or an image direction.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for detecting a facial feature, the method comprising:
   extracting a face area from a captured image;
   extracting concerned points corresponding to the position of at least one feature point from the extracted face area;
   dividing the extracted face area into a plurality of sub areas;
   extracting local maxima points from the plurality of sub areas;
   selecting optimum areas, which have highest similarities with the concerned points, around the extracted local maxima points; and
   determining which one of the selected optimum areas has a largest value of similarity with the concerned points among the highest similarities;
   wherein the selecting of the optimum areas comprises:
   configuring a mask having a feature vector of a local maxima point serial number of a facial feature value and having a predetermined size around the local maxima point;
   measuring similarities between a facial feature and areas obtained by shifting the mask vertically and horizontally as much as a predetermined distance; and detecting an area which has highest similarity by moving the mask as much as the predetermined distance in a direction yielding higher similarity.

2. The method according to claim 1, wherein the extracting of the face area is performed by using Adaboost algorithm.

3. The method according to claim 1, wherein the extracting of the concerned points is performed by using radial symmetry transform.

4. The method according to claim 1, wherein the similarity with the facial feature is measured by a support vector machine.

* * * * *